US008922088B2

United States Patent
Henning et al.

(10) Patent No.: US 8,922,088 B2
(45) Date of Patent: Dec. 30, 2014

(54) ROTOR WITH WINDING ELEMENTS AND A WINDING HEAD ADJACENT TO A ROTOR BODY FOR A DYNAMOELECTRIC MACHINE

(75) Inventors: Holger Henning, Giengen (DE); Philipp Eilebrecht, Heidenheim (DE); Stefan Veser, Treffelhausen (DE); Thomas Hildinger, Parnaiba (BR)

(73) Assignee: Voith Patent GmbH, Heidenheim (DE)

( * ) Notice: Subject to any disclaimer, the term of this patent is extended or adjusted under 35 U.S.C. 154(b) by 39 days.

(21) Appl. No.: 13/643,781

(22) PCT Filed: Apr. 27, 2011

(86) PCT No.: PCT/EP2011/002111
§ 371 (c)(1),
(2), (4) Date: Mar. 5, 2013

(87) PCT Pub. No.: WO2011/141128
PCT Pub. Date: Nov. 17, 2011

(65) Prior Publication Data
US 2013/0187493 A1    Jul. 25, 2013

(30) Foreign Application Priority Data

May 12, 2010  (DE) .......................... 10 2010 020 415

(51) Int. Cl.
*H02K 3/51* (2006.01)
*H02K 3/46* (2006.01)
*H02K 3/00* (2006.01)

(52) U.S. Cl.
CPC ........................................ *H02K 3/51* (2013.01)
USPC ............ 310/194; 310/260; 310/270; 310/271

(58) Field of Classification Search
CPC ................................... H02K 3/46; H02K 3/51

USPC ............. 310/194, 216.113, 260, 270, 64, 271
See application file for complete search history.

(56) References Cited

U.S. PATENT DOCUMENTS 4,488,079 A * 12/1984 Dailey et al. .................. 310/260

FOREIGN PATENT DOCUMENTS

| CH | 592 380 | 10/1977 |
|---|---|---|
| DE | 502 257 | 7/1930 |
| DE | 701 612 | 1/1941 |
| DE | 701612 C1 * | 1/1941 |
| DE | 195 19 127 | 9/1996 |
| DE | 195 35 700 | 3/1997 |
| DE | 19535700 A1 * | 3/1997 |
| DE | 196 35 295 | 10/1997 |
| DE | 10 2007 000 668 | 5/2009 |
| EP | 0 736 953 | 9/2000 |
| WO | WO 9637030 A1 * | 11/1996 |

OTHER PUBLICATIONS

Machine Translation DE19535700 (1997) and WO9637030 (1996).*

* cited by examiner

*Primary Examiner* — Tran Nguyen
*Assistant Examiner* — Jose Gonzalez Quinones
(74) *Attorney, Agent, or Firm* — Farjami & Farjami LLP

(57) ABSTRACT

Provided is a rotor for a dynamoelectric machine. The rotor includes winding elements arranged in axially extending grooves of a rotor body, a winding head arranged axially adjacent to the rotor body, and a winding head carrier, connected to the winding head by means of tension bolts, all arranged in such a way that reliable securing of the winding head against radial expansion due to centrifugal forces is ensured, while resulting in a compact and cost-effective configuration as well as sufficient cooling.

13 Claims, 2 Drawing Sheets

ROTOR WITH WINDING ELEMENTS AND A WINDING HEAD ADJACENT TO A ROTOR BODY FOR A DYNAMOELECTRIC MACHINE

This is a U.S. national phase application, which is based on, and claims priority from, PCT application Serial No. PCT/EP2011/002111, filed Apr. 27, 2011, which claims priority from foreign application Serial No. 10 2010 020 415.3, filed May 12, 2010, in Germany.

BACKGROUND OF THE INVENTION

The invention relates to a rotor for a dynamoelectric machine such as an electric generator, according to the kind as defined in closer detail in the preamble of claim 1.

For the purpose of fastening winding heads of rotor windings it is common practice among other things to support the winding heads on the inside by an annular winding head carrier and to fix the winding heads to said winding carrier by means of binding bands. Especially in the case of larger machines it is also possible to use a ring divided several times instead of a binding band, which ring rests with intermediate insulating layers on the winding heads and is fixed by means of screws to the winding carrier. Caps can also be slid over the winding heads in the case of especially large centrifugal forces. Such caps are especially used for fixing the winding heads of rotors of turbogenerators (see book "Leitfaden der Elektrotechnik" (Electrical Engineering Guide), Vol. 3, "Konstruktions-und Festigkeitsberechnungen elektrischer Maschinen" (Calculations of Construction and Strength of Electrical Machines), author: Dr. C. von Dobbeler, 1962, B. G. Teubner Verlagsgesellschaft Stuttgart, pp 25 to 29 and 58 to 62, DE 26 29 574 B2; DE-PS 7 01 612). It is further known to absorb the centrifugal forces originating from the revolving excitation coil of a synchronous machine with the help of holding bridges resting on the outer face side of the excitation coil, which holding bridges are held on their part by bolts which are subjected to tension and are fastened to the running body of the machine (DE-PS 9 50 659).

The task of Fixing winding heads of a rotor applies especially in rotor-fed slip-ring machines, as are used for speed-controllable hydraulic-power motor generators for pumped-storage operation. It is characteristic for such generator motors among other things that the rotor can have a diameter of 3 to 8 m. It is known for fixing the winding heads of such a rotor to arrange holding rings via trestles on the rotor body, in which the ends of U-shaped tie-bolts are fixed. One respective tie-bolt grasps with its U-shaped end over a winding head (Report 11-104 "Development and achieved commercial operation . . . , for a pumped storage power plant", of CIGRE Conference 1992, 30 Aug. to 5 Sep., JP 08-0908444 A). Such winding head fixing is very complex from a constructional and mounting viewpoint.

DE 195 19 127 C1 describes a dynamoelectric machine of the kind mentioned above. The securing device against centrifugal forces comprises tie rods which act with their radially inner ends on the support ring and with their radially outer ends on bearing boxes which rest on the winding heads radially on the outside.

The winding heads are current-carrying. They are therefore heated to higher temperatures and expand. The support ring on the other hand is not current-carrying and therefore remains cold. In order to prevent mechanical tensions resulting therefrom, cooling air is supplied to the air gap between the support ring and the winding heads, mostly from the face side of the machine. The cooling air enters the radial gap between the winding heads, flows through said winding heads in the radial direction and exits again outside of the winding heads. Practice has shown that this kind of cooling is insufficient when the bearing boxes—as in the aforementioned German specification—are comparatively large and substantially cover the circumferential area of the winding head.

A configuration is therefore known from DE 195 13 457 A1 which comprises radially extending openings in the region of the winding head carrier which is disposed adjacent to the rotor body in order to allow cooling air to flow into the region of the winding head. In order to ensure sufficient through-flow, support bodies are connected via tie rods with a support ring in the region of the winding head carrier for the purpose of supporting the winding head against centrifugal forces. Said support bodies are provided with a comparatively small configuration and are arranged in a distributed manner over the winding elements extending in the region of the winding head largely at an angle in relation to the axial direction.

Although the described configuration allows better cooling of the winding elements in the region of the winding head, it has an exceptionally overall size because sufficient space for radially guiding the tension bolts between the individual winding elements needs to be provided. Furthermore, it shows decisive disadvantages in air resistance. The support bodies which are distributed in a very numerous way and with large distance with respect to one another over the winding head produce high amounts of swirling of the air with a resulting high air resistance, especially in the case of rapidly running machines.

BRIEF SUMMARY OF THE INVENTION

The invention is based on the object of providing a rotor for a dynamoelectric machine according to the preamble of claim 1 in such a way that reliable securing of the winding head against radial expansion due to centrifugal forces is ensured on the one hand, and a compact and cost-effective configuration can be realized on the other hand in combination with sufficient cooling.

This object is achieved by the features in the characterizing part of claim 1. Further advantageous embodiments are provided from the sub-claims that are dependent thereon.

The solution in accordance with the invention provides that support bodies with tension bolts are arranged about the winding head in such a way that the tie rods are able to extend through hollow spaces between the individual winding elements, which hollow spaces are provided anyway. The tension bolts are arranged for this purpose in such a way that they extend between the winding elements, which occurs in regions of the windings in which they extend axially or in the regions of the bend of the winding elements from the axial direction in a direction extending at an angle to the axial direction. As a result, a winding head can be realized which is highly compact in the axial direction since the winding elements are able to extend very close to one another in the region in which they will then extend at an angle to the axial direction. A winding head is therefore produced which is very short in the axial direction and which comprises only very short free paths of the winding elements in their parts extending in an inclined manner. The winding elements will then extend in the region of their axial ends in the axial direction, thus producing the distance again between the individual winding elements, as is provided during the exit from the rotor body or the groups in which the winding elements extend there. As a result, sufficient space is also produced here for further tension bolts and associated support bodies in the axially extending areas or the areas of the bend. The configuration is then realized in such a way that the support bodies form at least two segmented annular arrangements which are disposed circumferentially in a spaced manner in the axial direction from one another, which occurs especially in the regions in which they are connectable by the tie rods with the winding head carrier without any additional need for space.

In addition to a very short winding head in the axial direction, the rotor arranged in accordance with the invention comprises two segmented annular arrangements of the support bodies which are spaced from one another in the axial direction, between which a free region remains so that cooling air can flow very well between these two annular arrangements and can cool the winding elements. As a result of the annular arrangements which are formed by the individual support bodies, a configuration is further produced which has a comparatively favorable resistance coefficient and therefore produces a considerably lower amount of air resistance even in the case of a rapidly revolving rotor than the configuration described in the initially mentioned state of the art with several support bodies which are arranged to be spaced from one another.

The rotor in accordance with the invention allows a simple and compact configuration, which in the region of the winding head carrier saves space and therefore material of the winding head carrier, especially material in the winding elements. Since this material is typically a material that conducts electricity very well (e.g. copper), a considerable cost advantage can be achieved. The shorter and smaller configuration of the winding head and the winding head carrier supporting the winding head further allows saving weight in a region of the rotor which is disposed radially relatively far to the outside.

The highly compact winding head offers the further advantage that the bearing span for bearing the rotor can be reduced. Such a smaller bearing span for bearing the rotor allows higher critical whirling speeds and represents a considerable constructive advantage.

It is further provided in an advantageous further development of the rotor in accordance with the invention that two respective winding elements will emerge in the axial direction from each of the grooves, wherein the one of the winding elements extends at an angle to the right in relation to the axial direction after a passage in the axial direction and the other of the winding elements extends at an angle to the left in relation to the axial direction. The winding elements will then extend again over a short distance in the axial direction at the other end of the winding head as seen in the axial direction before they are connected with one another. As a result, the tension bolts are arranged between the rotor body and the first crossing of winding elements on the one side and between the last crossing of winding elements and the connection of the winding elements on the other side, as seen from the direction of the rotor body. This configuration also arranges the tension bolts in the free regions, especially in the region of the bend of the individual winding elements. The tension bolts can be pushed so far in the direction of the crossing points of the crossing winding elements that they are virtually enclosed by the two crossing winding elements and the material of the rotor body extending between the grooves between a kind of triangle, and therefore can be arranged in an especially compact manner. The configuration of the rotor can be reduced even further by this especially compact arrangement.

The support bodies can be arranged in different sizes, so that they will typically rest on two or more winding elements and will support them in the radial direction against centrifugal forces. It is provided in an especially appropriate and preferred embodiment that one respective support body is respectively associated with one tension bolt. This is especially appropriate and simple in order to enable the exchange of defective support bodies and/or tension bolts in a simple and efficient way. The division among a larger number of support bodies which are respectively fastened with a tension bolt, further allows removing only very few support bodies and tension bolts in a purposeful manner in the case of an optionally necessary exchange of a winding element in order to thereby enable the exchange of the affected winding.

It is provided in a further highly advantageous embodiment of the rotor in accordance with the invention that the support bodies are made of a fiber-reinforced material. Such fiber-reinforced materials which may comprise ordered or unordered fibers in a matrix material made of plastic allow a very cost-effective configuration and a respectively high amount of strength in combination with comparatively light weight, so that the necessary support of the winding heads can be realized against centrifugal forces in the region of the winding head by saving costs and weight. A configuration in form of a glass-fiber-reinforced plastic material will be sufficient in most machines for the purpose of absorbing the occurring centrifugal forces. In the case of rapidly revolving machines, the support bodies can also be made of carbon-fiber-reinforced plastic. The weight will be reduced even further in combination with higher strength, but at slightly higher cost.

The configuration of the support body which is made of fiber-reinforced material further offers the advantage that it can be produced with a comparatively freely choosable shaping in a simple and efficient way. The support bodies can be arranged in such a way that they are not arranged as cuboid plates, but are provided with a certain amount of rounding off and therefore form a segmented, but highly homogeneous ring after mounting which can be optimized with respect to air resistance by edges that are rounded off in the axial direction.

The tension bolts can be arranged in virtually any way whatsoever. In particular, tension bolts can be provided which have threads on both sides and are typically fastened by plain washers and nuts in the region of the support bodies and with a thread in the region of a profile element in the profile groove for example. This configuration, and also all other known configurations of tension bolts, is provided with a comparatively high number of components and may potentially have negative effects on the air resistance produced by the rotor. That is why it is provided in a highly advantageous further development of the invention that the tension bolts are integrally arranged with screw heads with an internal profile, with the screw heads resting in depressions of the support bodies in the mounted state. Such a configuration with screw heads with an internal profile (internal drive) such as a hexagon socket, a torx or the like is very simple and efficient concerning mounting. The screw heads can be provided with a chamfered configuration and rest in chamfers in the region of the support bodies, which chamfers are arranged about the holes for the tension bolts. The screw heads will disappear during mounting in the support bodies in such a way that a comparatively planar surface of the support body to the outside is produced, which offers a comparatively low air resistance. Other than in tension bolts which need to be fastened with plain washers and nuts, a configuration is further obtained which can make do with a reduced number of parts and is therefore easier to handle in mounting. This also leads to an advantage both with respect to weight and also the costs of the material and mounting.

It is provided in a further highly advantageous embodiment of the rotor in accordance with the invention that the tension bolts are fastened in the region of the winding head carrier in such a way that they ensure mobility of the support bodies in the axial direction. This mobility of the support bodies in the axial direction is advisable because the winding elements are current-carrying and will therefore heat up accordingly. The winding head carrier itself will not be heated, or at least not to such a high extent. As a result of this differently strong heating and the different materials, a relative movement of the components with respect to one another can occur, especially in the direction of the longest expansion of the winding elements, i.e. substantially in the axial direction of the rotor. In order to respectively compensate such a linear expansion which frequently cannot be avoided entirely even in the case of good cooling, the tension bolts can be fastened in the region of the winding head carrier in such a way that axial mobility of the support bodies is enabled. As a result, unnecessary tensions and high mechanical loads on the support bodies and the tension bolts can be prevented.

It is provided in a possible embodiment thereof that the tension bolts are screwed into profile bodies in the axial direction for securing the mobility of the support bodies, which tension bolts are arranged in the region of the winding head carrier in corresponding, axially extending profile grooves or profile groove sections. Such profile bodies can be arranged in dovetail-like profile grooves, with the support bodies being clamped with the winding head carrier only to such an extent that axial mobility is still ensured. The profile bodies can then slide in the profile grooves. It is possible to use one single profile body for two respective tension bolts arranged in alignment the axial direction, which single profile body is arranged in a profile groove or in several, axially aligned profile groove sections. It is also possible to provide a separate profile body in a separate profile groove for each of the tension bolts. It is also possible to provide profile grooves which extend in the circumferential direction to such an extent that they are able to accommodate several adjacently disposed tension bolts in the circumferential direction.

Alternative embodiments in the form of tiltable bolts, which can also ensure axial mobility of the tension bolt in such a winding head, have been described especially in the German patent application DE 10 2009 016 516 A1. A third possibility in which a support ring is arranged in an axially displaceable manner in its entirety in the interior of the winding head is shown in the German patent application DE 10 2009 016 515 A1.

It can additionally be provided in a further embodiment of the rotor in accordance with the invention that radially extending openings for through-flow with cooling air are provided in the region of the winding head carrier. Such openings, which can be arranged in the region of the winding head carrier in form of annular interruptions in the winding head carrier or radially extending channels, also improve the ventilation of the winding head. Very good through-flow of the winding elements in the region of the winding head with cooling air is enabled in this way in combination with the area which freely remains between the segmented annular arrangements of the support bodies, so that said winding elements can be cooled very well. Good cooling also allows reducing the axial relative movement of the winding element in relation to the winding head carrier, so that in the case of the aforementioned measures it is merely necessary to ensure that comparatively short paths of axial relative movement are enabled in the components with respect to one another as required.

BRIEF DESCRIPTION OF THE DRAWINGS

Further advantageous embodiments of the rotor in accordance with the invention are provided from the remaining dependent sub-claims and further from the embodiment which will be explained below in closer detail by reference to the drawings, wherein:

DETAILED DESCRIPTION

Figure 1:
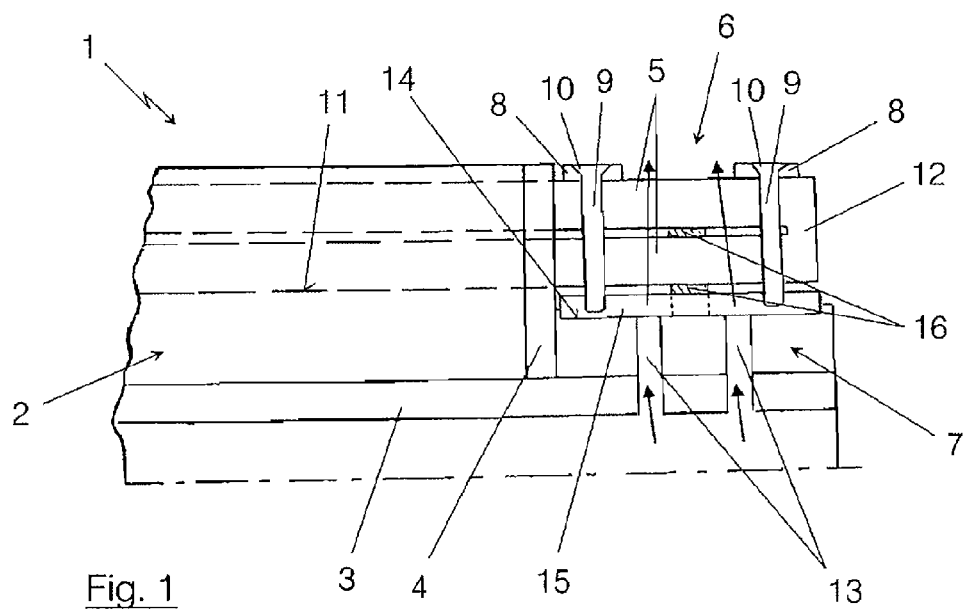
FIG. 1 shows a schematic sectional view through a partial section of the rotor in accordance with the invention.

The illustration of FIG. 1 shows a schematic diagram of a section of a rotor 1 of a dynamoelectric machine. Such a rotor 1 can have an outside diameter which has a magnitude of 3 to 8 m for example. The rotor 1 typically consists of a rotor body 2, which is generally arranged in a laminated manner, i.e. of a plurality of sheets which are stacked on top of one another in the axial direction. The rotor body 2 can be carried for example by a hub 3, as indicated in this case by way of example. In the typical laminated configuration of the rotor body 2, it is axially tensioned by means of a pressure plate 4. Numerous grooves 11 which are distributed over the circumference are provided in the rotor body 2, in which winding elements 5 are arranged in the known manner. The illustration of FIG. 1 does not show the laminated arrangement in the illustration of the rotor body 2. Similarly, the grooves 11 are not recognizable, only the winding elements 5 extending in said grooves are indicated by the covered lines. The winding elements 5, which are typically arranged in form of bars 5 (i.e. a so-called top bar and a so-called bottom bar) between which an insulating layer is disposed, protrude at the axial end of the rotor body 2 beyond said end and form the so-called winding head 6 in said region.

In the region of said winding head 6, the ends of the winding elements 5 are connected with one another in a predetermined manner, wherein the ends of the winding elements 5 from the one first groove being respectively connected with the ends of winding elements 5 of a group which is arranged by a number of n-grooves adjacent to said first groove. It is generally the case that the top bar is connected with a groove adjacent on the right by the distance of n-grooves or the bottom bar disposed therein, whereas the bottom bar is connected with a groove adjacent on the left by the distance of n-grooves or the top bar disposed therein, or vice versa. The illustration of FIG. 1 shows such a connection 12 only in a schematic manner. It can be formed by suitable connecting elements or by winding elements 5 integrally connected with each other.

In order to realize this it is necessary and common practice that the individual winding elements 5, once they have left the rotor body 2 or the group 11, continue axially over a short distance and are then bent off at an angle in relation to the axis in order to reach the region of the winding elements 5 with which they are connected at their end.

The winding elements 5 are typically made of a material which conducts electricity very well, e.g. copper. Since this material is comparatively soft, the winding elements 5 are easily deformed as a result of the centrifugal forces occurring during the rotation of the rotor 1 in the region of the winding head 6 and are bent outwardly unless they are supported. In the case of the rotor 1 that is shown here, the support of the winding elements 5 in the region of the winding head 6 is arranged in such a way that a winding head carrier 7 is arranged radially within the winding head 6 and coaxially in relation to the same, which winding head carrier also rests on the hub 3 or an extension of the hub 3, and revolves accordingly with the hub 3 and the rotor body 2. Said winding head carrier 7 can also be arranged in a laminated manner, or can be made alternatively from a massive material or arranged as a hollow body in form of a structure welded from individual elements for example.

The winding elements 5 are provided in the region of the winding head 6 with support bodies 8 resting on the winding elements 5, which support bodies are connected on their part via tension bolts 9 with the region of the winding head carrier 7. The support bodies 8 are preferably arranged as individual small plates or small blocks which consist of a non-magnetic material. In particular, the support bodies 8 can be made of an electrically insulating material, e.g. a glass-fiber-reinforced plastic, or optionally also of a plastic material reinforced with carbon fibers in the case of rapidly running machines. The fibers can be especially arranged as short fibers irregularly in the material of the support body 8, or—if very high forces need to be absorbed—also in form of coiled fiber strands, woven Fiber mats or the like in an ordered arrangement preferably following the power flow. The individual support bodies 8 are now connected with the tension bolts 9 with the winding head carrier 7, so that they are able to support the winding elements 5 against centrifugal forces. As already indicated by the name, the tension bolts 9 are subjected to tension. Optional support elements 16 can further be provided between the winding elements 5 and/or the winding head carrier 7, which support elements are shown in the illustration of FIG. 1.

The configuration of the tension bolts 9 does not play any decisive role. It can be provided however that the tension bolts 9 are integrally arranged with a screw head 10, which forms an internal profile (internal drive). Said screw head 10 with the internal profile offers the advantage that it can be sunk nearly completely in a suitable depression of the support body 8, so that the configuration of tension bolts 9 and support bodies 8 has a comparatively smooth surface after mounting and therefore offers the lowest possible air resistance. All alternatives and generally known structures of tension bolts 9 are also possible.

Figure 2:
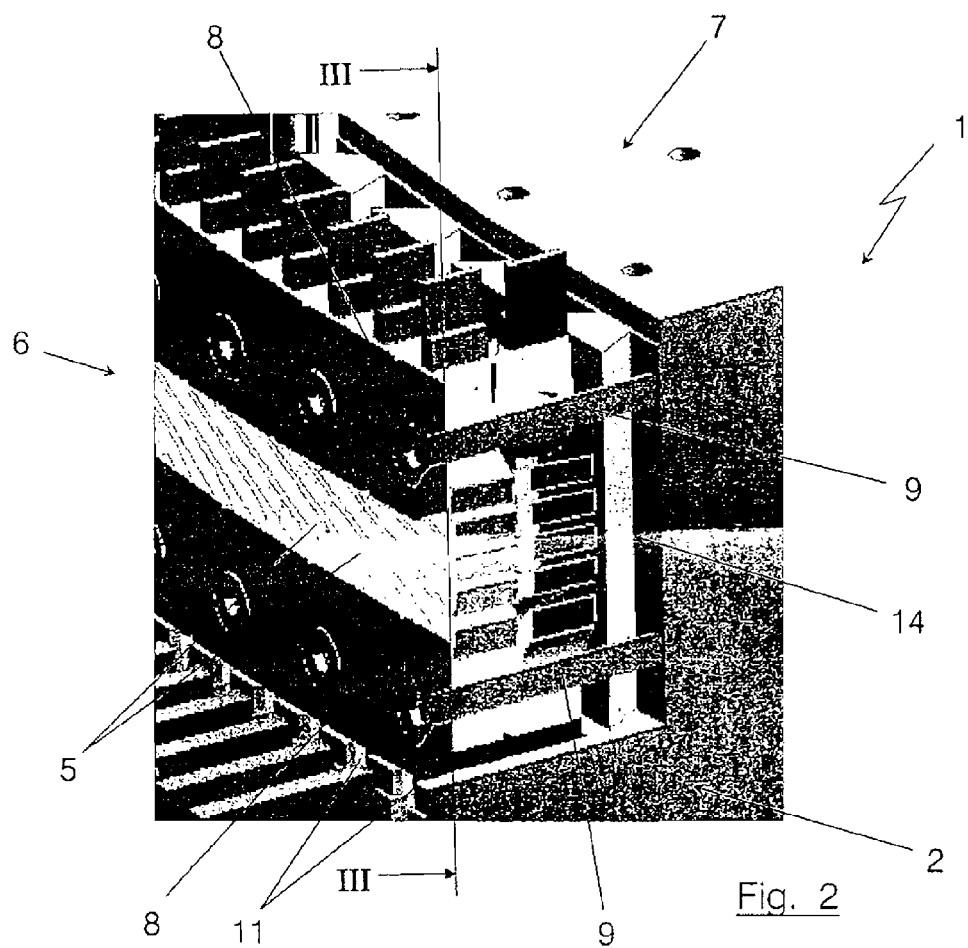
FIG. 2 shows a three-dimensional view of a section of a winding head of the rotor in accordance with the invention.

The illustration of FIG. 2 shows this configuration again in a three-dimensional view. In this case too, the rotor body 2 and the winding head carrier 7 are shown in this simplified illustration as a single integral component. It will typically be arranged in a laminated manner especially in the region of the rotor body 2. Several winding elements 5 in form of top bars and bottom bars are shown in the partial sectional view of the three-dimensional illustration, which bars protrude from the grooves 11 of the rotor body 2 and are chamfered after a certain running distance in the axial direction at an angle to the axis in order to then be connected at their ends with the winding elements 5 which extend through other grooves. The top bar for example will bend off in the axial direction to the right after leaving the groove and after a certain running length, and the bottom bar arranged in the respective groove 11 will respectively bend off to the left.

Figure 3:
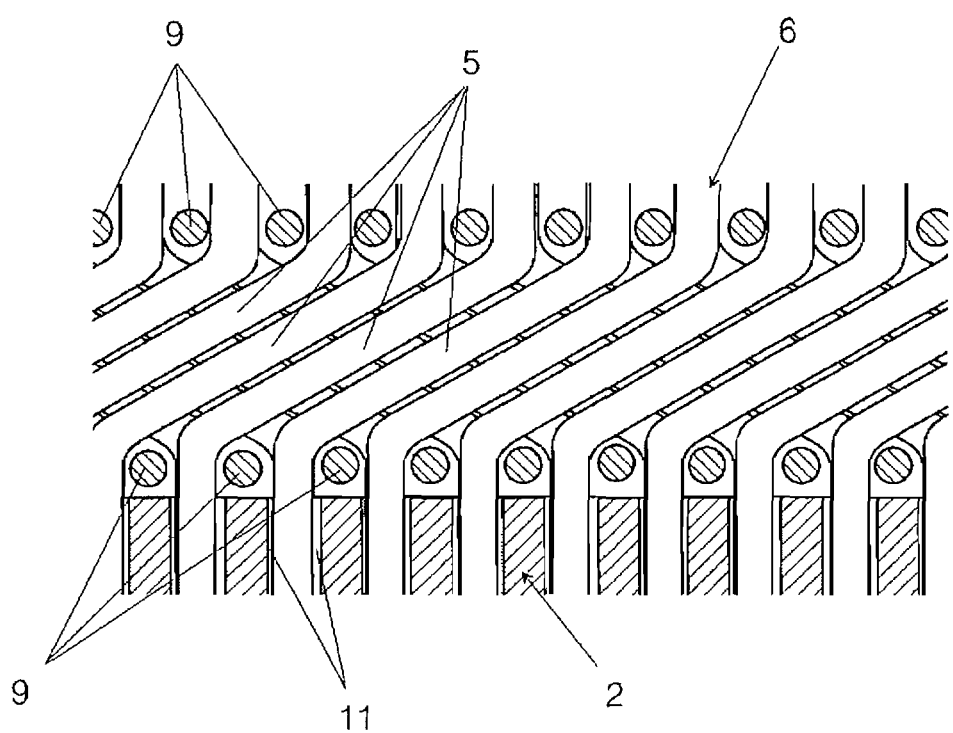
FIG. 3 shows a schematic sectional view along the line in FIG. 2.

Furthermore, the illustration of FIG. 2 shows that each of the support bodies 8 is associated with a tension bolt 9, and that the tension bolts 9 are arranged in a manner which is shown in closer detail within the scope of FIG. 3 that, they radially penetrate the winding elements 5 in the axially extending regions or the regions of the bend. Since the grooves 11 need to be arranged to be spaced from one another in the rotor body 2, a free space is obtained between the individual winding elements 5 in the region in which the winding elements 5 still extend in the axial direction and are then bent off. The free space lies especially between the rotor body 2 and the first crossing of winding elements 5 of the top bar and the bottom bar of the adjacent groove 11 on the side facing the rotor body 2. On the side facing the connections 12, the free space is disposed especially in the region between the last crossing of winding elements 5 of the top bar and the bottom bar and the connection 12, as shown in FIG. 1. The tension bolts 9 can be pushed through the free space in the configuration of the rotor 1 as shown here. The tension bolts 9 are therefore arranged in regions in which overall space is available for them without having to provide a constructional adjustment of the winding head 6. This allows providing the winding head 6 with a very compact configuration in the region in which the winding elements 5 extend obliquely in relation to the axis because the winding elements 5 can be guided here very close to one another. The winding head 6 can therefore be arranged in an exceptionally compact way in the axial direction. Overall space and weight are saved, and in particular less of the comparatively expensive material of the winding elements 5 which conducts electricity very well such as copper will be required. The configuration is therefore exceptionally compact, light and can be realized in a respectively cost-effective manner.

Since the regions in which the free spaces are disposed between the winding elements 5 are typically disposed in the region in which the winding elements 5 emerge from the grooves 11 and in the region where the winding elements 5 are connected at their ends, a configuration is obtained by the arrangement of the tension bolts 9 and the support bodies 8, wherein one of the support bodies can be associated with one of the tension bolts 9, in which the support bodies 8 form two axially spaced, segmented annular arrangements about the circumference of the winding head 6. As a result of the axial spacing of the support bodies 8, the winding elements 5 must be capable as a result of their material properties to carry the centrifugal forces in this section themselves. However, this is not critical in the case of the typically provided dimensioning of the top and bottom bars 5 because the configuration in accordance with the invention especially allows a winding head 6 which is very compact in the axial direction, and this distance is therefore respectively small.

The distance between the axially spaced, annular arrangements of the support bodies 8 is still sufficient in order to allow cooling air to pass through the region of the winding head 6 in order to enable very good cooling of the winding elements 5 in the region of the winding head 6. For this purpose, the illustration of FIG. 1 additionally shows radially extending openings 13, which in this case penetrate the hub 3 or the protrusion of the hub 3 and the winding head carrier 7, and thereby enable a cooling air flow according to the illustrated arrows typically from the inside to the outside through the winding head. The configuration can therefore be arranged in an exceptionally compact and cost-effective way, and further allows very good cooling of the winding elements 5 in the region of the winding head 6.

Despite the comparatively good cooling of the winding head 6 in the configuration as illustrated here, different temperatures occur in the winding elements 5 on the one hand and in the winding head carrier 7 on the other hand as a result of the different materials of the winding head carrier 7 and the winding elements 5 and due to the fact that electric current flows through the winding elements 5. This may lead to relative movements that are thermally induced in operation between the winding elements 5 and the winding head carrier 7, which movements can lead to strong mechanical tensions that should be avoided to the highest possible extent. The connection of the support bodies 8 or the tension bolts 9 in the region of the winding head carrier 7 should be arranged in such a way that it allows an at least slight movement in the axial direction. This has been realized in the preferred embodiment of the rotor 1 as shown here in such a way that grooves 14 are arranged in the region of the winding head carrier 7, which grooves extend in the axial direction. These grooves 14 are shown especially in the illustration of FIG. 2. In addition to the continuous grooves 14, which extend over the entire axial length of the winding head carrier 7, it would also be possible to arrange axially aligned groove sections in the region of the winding head carrier 7 axially facing the rotor body 2 for example and in the region of the winding head carrier 7 which axially faces away from the rotor body 2. Such a configuration could further promote the circulation of cooling air, but it is slightly more complex in production.

Suitable profile bodies 15 are arranged in the grooves 14, which are not shown in the three-dimensional illustration of FIG. 2. Such a profile body 15 is shown as a continuous profile body 15 in the illustration of FIG. 1. It can be arranged for example in a groove 14 extending continuously in the axial direction, which groove especially comprises the dovetail profile as shown in FIG. 2. The profile body 15, as shown in FIG. 1, accordingly needs to have the same profile. Instead of the continuous groove 14 in the axial direction, it is also possible to provide two or more groove sections in alignment in the axial direction, as already discussed above. Accordingly, the profile body 15 can also be subdivided accordingly, so that a profile body 15 is present as a counterpart merely in the region of the tension bolts 9 in which the tension bolt 9 is accommodated especially by way of a thread. Such a configuration allows a slight movement in the axial direction of the profile body 15 in relation to the group 14 in the case of a suitably chosen tightening torque of the tension bolts 9 and therefore of the support bodies 8 supporting the winding elements 5 in relation to the winding head carrier 7.

The invention claimed is:

1. A rotor for a dynamoelectric machine, comprising:
   winding elements which are arranged in axially extending grooves of a rotor body;
   a winding head which is arranged axially adjacent to the rotor body, wherein in a region of the winding head the winding elements exit the grooves in the axial direction, then extend at an angle to the axial direction, and then extend in the axial direction again in the vicinity of the axial ends of said winding elements and are connected with further winding elements; and
   two respective winding elements exit in the axial direction from each of the grooves, wherein after a section in the axial direction the one of the winding elements extends at an angle to the right in relation to the axial direction and the other of the winding elements extends at an angle to the left in relation to the axial direction, and thereafter the winding elements extend in the axial direction again in the region of their axial ends and have a connection with other winding elements;
   a winding head carrier which is radially arranged within the winding head;
   the winding head is connected with the winding head carrier by means of tension bolts which engage at the radially outer ends thereof on support bodies, which in turn lie on the winding elements in the region of the winding head;
   the tension bolts are arranged between the rotor body and the first crossing of winding elements and between the last crossing of winding elements and the connection, as seen from the direction of the rotor body;
   the tension bolts penetrate the winding head in the radial direction in the axially extending areas or the areas of the bending of the winding elements from the axial direction to the direction extending at an angle from the axial direction;
   the support bodies form at least two circumferential segmented annular arrangements spaced in the axial direction;
   the tension bolts are fastened in the region of the winding head carrier in such a way that mobility of the support bodies in the axial direction is provided; and
   the tension bolts are screwed into profile bodies which are arranged in the region of the winding head carrier in corresponding, axially extending profile grooves or profile groove sections.

2. The rotor according to claim 1, wherein one of the support bodies is respectively associated with one tension bolt.

3. The rotor according to claim 1, wherein the support bodies are made of a non-magnetic, electrically insulating, material.

4. The rotor according to claim 2, wherein the support bodies are made of a non-magnetic, electrically insulating, material.

5. The rotor according to claim 1, wherein the support bodies are made of a fiber-reinforced material.

6. The rotor according to claim 2, wherein the support bodies are made of a fiber-reinforced material.

7. The rotor according to claim 3, wherein the support bodies are made of a fiber-reinforced material.

8. The rotor according to claim 4, wherein the support bodies are made of a fiber-reinforced material.

9. The rotor according to claim 5, wherein the material of the support bodies comprises ordered or unordered fibers, including at least one of glass fibers and carbon fibers, in a material matrix made of plastic.

10. The rotor according to claim 1, wherein the tension bolts are integrally arranged with screw heads with an internal profile, with the screw heads lying in depressions of the support body in a mounted state.

11. The rotor according to claim 1, wherein radially extending openings for a through-flow of cooling air are provided in a region of the winding head carrier.

12. A rotor for a dynampelectric machine, comprising:
   winding elements which are arranged in axially extending grooves of a rotor body;
   a winding head which is arranged axially adjacent to the rotor body, wherein in a region of the winding head the winding elements exit the grooves in the axial direction, then extend at an angle to the axial direction, and then extend in the axial direction again in the vicinity of the axial ends of said winding elements and are connected with further winding elements; and
   a winding head carrier which is radially arranged within the winding head;
   the winding head is connected with the winding head carrier by means of tension bolts which engage at the radially outer ends thereof on support bodies, which in turn lie on the winding elements in the region of the winding head;
   the tension bolts penetrate the winding head in the radial direction in the axially extending areas or the areas of the bending of the winding elements from the axial direction to the direction extending at an angle from the axial direction;
   the support bodies form at least two circumferential segmented annular arrangements spaced in the axial direction, wherein the support bodies are arranged only on an upper end and a lower end of the winding head;

the tension bolts are fastened in the region of the winding head carrier in such a way that mobility of the support bodies in the axial direction is provided; and the tension bolts are screwed into profile bodies which are arranged in the region of the winding head carrier in corresponding, axially extending profile grooves or profile groove sections.

13. The rotor for a dynamoelectric machine of claim 12, wherein:

two respective winding elements exit in the axial direction from each of the grooves, wherein after a section in the axial direction the one of the winding elements extends at an angle to the right in relation to the axial direction and the other of the winding elements extends at an angle to the left in relation to the axial direction, and thereafter the winding elements extend in the axial direction again in the region of their axial ends and have a connection with other winding elements;

the tension bolts are arranged between the rotor body and the first crossing of winding elements and between the last crossing of winding elements and the connection, as seen from the direction of the rotor body.

* * * * *